United States Patent [19]

Forde

[11] Patent Number: 4,493,299
[45] Date of Patent: Jan. 15, 1985

[54] APPARATUS FOR GIVING ENGINES POSITIVE EFFECT

[76] Inventor: Louis Forde, 482 Berriman St., Brooklyn, N.Y. 11208

[21] Appl. No.: 406,189

[22] Filed: Sep. 16, 1982

Related U.S. Application Data

[63] Continuation-in-part of Ser. No. 174,363, Aug. 1, 1980, abandoned, which is a continuation-in-part of Ser. No. 966,905, Dec. 6, 1978, abandoned.

[51] Int. Cl.³ ............................................. F02N 15/10
[52] U.S. Cl. .................................. 123/185 S; 192/41 A
[58] Field of Search .......... 123/41 R, 185 S, 197 AC, 123/197 C, 198 D, 198 R, DIG. 11; 188/82.7; 192/41 A, 45.1

[56] References Cited

U.S. PATENT DOCUMENTS

| 891,368 | 6/1908 | Potter | 123/198 D |
|---|---|---|---|
| 1,720,007 | 7/1929 | Schuler | 123/185 S |
| 2,018,229 | 10/1935 | Rayniak | 123/185 S |
| 2,163,052 | 6/1939 | Niemi | 123/197 C |
| 2,380,778 | 7/1945 | Murdock | 123/197 C |
| 3,114,355 | 12/1963 | Moo | 123/197 C |
| 3,729,076 | 4/1973 | de Lavalette | 192/41 A |
| 3,938,632 | 2/1976 | Giese et al. | 192/41 A |

FOREIGN PATENT DOCUMENTS 337905 11/1930 United Kingdom ............ 123/185 S

Primary Examiner—Ira S. Lazarus
Assistant Examiner—R. S. Bailey

[57] ABSTRACT

Apparatus for use in internal combustion engines requiring positive application for controlling transmitted pulses comprising: a base element mating with the front of the engine and having an inner cavity about a central axis. An overrunning clutch assembly is provided for constantly engaging inner periphery of the base element. As the assembly rotatably surrounds a sleeve, it engages and interconnects the base element and outer periphery of the circular sleeve which is key engaged to and surrounds portion of a crankshaft extending from the front of the engine. An L shaped block has an aperture and is positioned adjacent the base element. A bolt is adapted in the aperture for threadingly engaging the engine, so to removably secure and mate the L shaped block and the base element together and with the front of the engine, whereby a positive constant effective unit is formed. Another substantially identical control unit is provided, mated and secured to the rear of the engine while being coupled to the intermediate crankshaft which provides a common axis for co-operating units so that simultaneously, the attached units perform positive translation of engine pulses being transferred by the crankshaft whose motion reflects increase in velocity.

2 Claims, 3 Drawing Figures

4,493,299

APPARATUS FOR GIVING ENGINES POSITIVE EFFECT

This application is a continuation in-part application of Ser. No. 174,363 filed Aug. 1, 1980 which is a continuation in-part of Ser. No. 966,905 filed Dec. 6, 1978, both of which are now abandoned.

BACKGROUND OF THE INVENTION

1. Field of the Invention
2. Description of the Prior Art

The driving crankshaft of a two stroke engine, and the driving crankshaft of a four stroke engine, respectfully; makes each engine operative. Power is transmitted by the crankshaft which receives impulses of explosive forces from each combustion chamber in various impulse orders and at the rate of one pulse for each revolution in a two stroke engine, and at the rate of one pulse for each two revolutions in a four stroke engine. As the shaft receives each pulse the front output end and the rear output end of the crankshaft tend to oscillate as they act negatively at a very rapid rate. In a typical case negative occurrences appear at 1200, 1600 and 2400 rpm. The intensity being approximately twice as much at 1600 as at 1200, likewise twice as much at 2400 as at 1600. The resulting cumulative negative effect of the occurrences is unrealized output, therefore, energy loss.

In determining the efficiency of an i.c. engine the final velocity is measured by a speed indicator which is based on an equation devised by Galileo Galilei 1564–1642, where V=rpm. Since velocity equals revolution per minute, and rpm is the common denominator for measuring torque and computing horsepower of an i.c. engine, in view of the reading it is realized that V=rpm includes cumulative, uncounted negative influence.

For example, the crank on shafts of four cylinder in-line four stroke engines are arranged to receive impulses in the order of 1-2-4-3 or 1-3-4-2 providing control so that the power pulses always tend to "boost" the lagging section of the crankshaft to prevent negative twisting effect.

Further, engines having power pulses transferred to the crankshaft in sequence of 1-2-3-4 tend to have their output ends oscillate with greater intensity than the crankshafts of engine receiving irregular power pulses, therefore these engines present a great rocking problem—harder twisting effect. The harder the crankshaft tries to unwind the more vibrations there are, for that reason sequential impulse engines are not in use.

The disadvantages of excessive crankshaft oscillation, excessive engine vibration, etc., with resulting high fuel consumption are often cited as objects to be improved.

Since there is cumulative, uncounted negative influence in crankshaft velocity of the i.c. engine a control unit of a construction which is designed and positioned to receive rotational drive is achieved by respective sleeve means secured to and surrounding respective end of the crankshaft.

The internal operating cavity of each control unit is formed by inner periphery of a base element and external periphery of an associating sleeve means. An overrunning clutch unit providing positive constant engagement means includes an assembly which rotatably surrounds the sleeve and engages outer periphery of the sleeve as it, simultaneously, engages inner periphery of an associating base element that is mating front of the engine for providing positive translation.

Another substantially identical operating control unit is formed through utilization of the inner periphery of 2nd base element and external periphery of associating 2nd sleeve means as operational interconnecting surfaces. Second overrunning clutch unit providing positive constant engagement means which rotatably surrounds and engages periphery of 2nd sleeve means as it simultaneously engages the inner periphery of associating 2nd base element that is mating rear of the engine. Securing means are provided whereby the control units are positioned to be correspondingly, centered with the crankshaft and for mating with rear end of the engine as the second base element and second sleeve means are interconnected rotatably for providing positive translation. A bolt is adapted and inserted into a aperture which transverses portion of an L shaped block adjacent to the base element and threadingly engages the front of the engine so to mate and lock the L shaped block and the base element together and to the front of the engine. The bolt is capable of being loosened whenever free movement of the front control unit is required. A bolt is adapted and inserted into an aperture which transverses portion of 2nd L shaped block adjacent to 2nd base element and threadingly engages rear of the engine so to mate and lock 2nd block means and 2nd base element together and with the rear of the engine. The bolt is capable of being loosened whenever free movement of the rear control unit is required.

Therefore, it is an object of the present invention to provide control whereby a unit is located with respect to a predetermined corresponding output end for providing positive constant engagement application.

It is a further object of the present invention to provide means for coupling with a crankshaft which when installed on an engine provide controlled function whereby pulses from the engine are transferred, simultaneously giving positive effect, and also permitting cooperation to exist between the relative units employing a common central axis as the units perform positive translation. As motion in which every point including the front output end, portion intermediate the control units, and rear output end of the moving crankshaft has simultaneously the same velocity potential and direction of motion as the attached units perform positive translation of engine pulses being transmitted by the crankshaft.

BRIEF DESCRIPTION OF THE DRAWINGS

This and other objects, features, and advantages will become apparent from the following drawings in which.

DESCRIPTION OF THE PREFERRED EMBODIMENT

Figure 1:
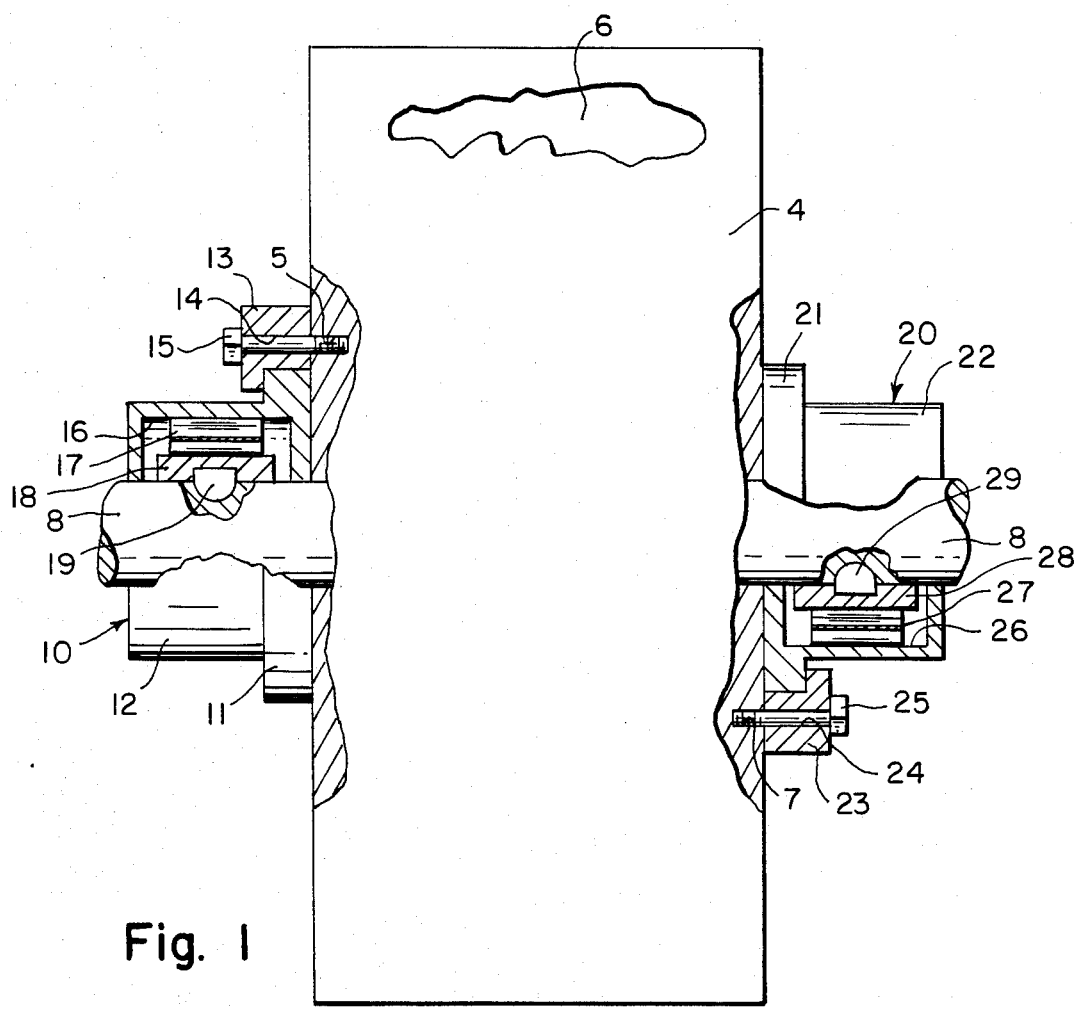
FIG. 1 illustrates control units of the present invention in an elevational cross-section view with respect to engine mounting.
Figure 2:
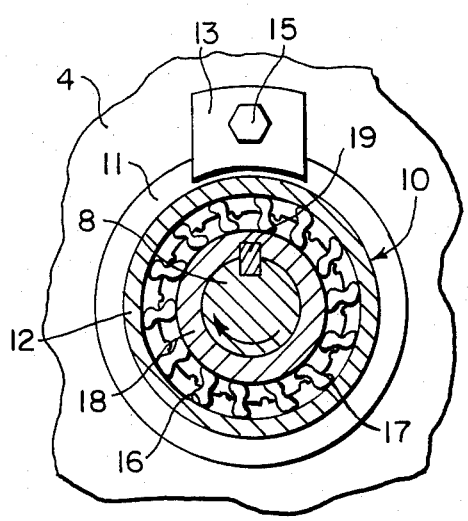
FIG. 2 is a frontal cross-sectional view of the front unit of the invention.

The present invention includes a control unit 10 as shown in FIG. 1 as being mated with front end of an engine 4 which has combustion chamber 6. A key 19 provides secured connection between crankshaft 8 and sleeve 18 as sleeve 18 receives rotational drive from engine 4. The control unit 10 is hereinafter referred to in FIGS. 1-2 and comprises a base element 12 which has a mounting flange 11 positioned adjacent front of engine 4 with an associated securing L shaped block 13. An aperture 14 is shown transversing portion of block 13. Overrunning clutch unit 17 operating in circular cavity 16 constantly engages inner periphery of base element 12 and outer periphery of sleeve 18. Bolt 15 is adapted in aperture 14 as it threadingly engages hole 5 in front of engine 4 so as to lock block 13 and base element 12 together and to the engine 4 so that unit 10 provides control at the front of the engine 4.

Figure 3:
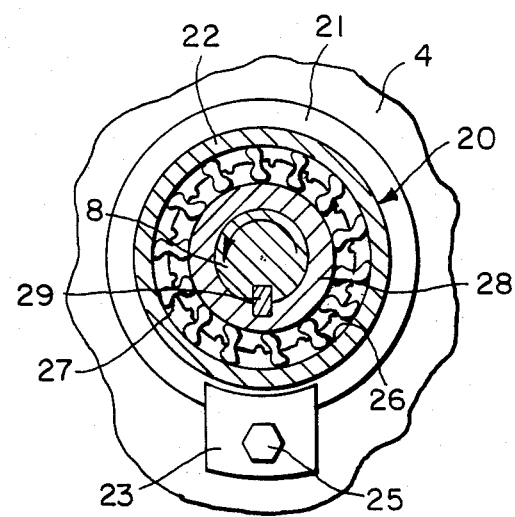
FIG. 3 is a rear cross-sectional view of the rear unit of the invention.

A substantially identical control unit 20 is shown in FIG. 1 as being mated with rear of engine 4. Key 29 provides secured connection between a portion at opposite end of crankshaft B and sleeve 28 which surrounds respective end of crankshaft 8 for receiving rotational drive from rear of engine 4. Second control unit 20 is hereinafter referred to in FIGS. 1 and 3 and comprises: a base element 22 including a mounting flange 21 positioned adjacent rear of engine 4 and 2nd L shaped block 22 having a portion with aperture 24 extending transversely of it. Second overrunning clutch unit 27 is shown operating in circular cavity 26 as it constantly engages inner periphery of base element 22 and outer periphery of 2nd sleeve 28. Bolt 25 is adapted in aperture 24 as it threadingly engages hole 7 in rear of engine 4 so as to mate and lock block 23 and flange 21 of base element 22 together and to the rear of engine 4 so that unit 20 provides control at the rear of engine 4. In operation, front portion of crankshaft 8 is coupled to sleeve 18 through means of key 19, and rear portion of crankshaft 8 is coupled to sleeve 28 through means of key 29 so the sleeve 18 and sleeve 28 receive rotational drive from engine 4. The rotation of crankshaft 8 is controlled for proper power pulses from combustion chamber 6. The pulses are transmitted through crankshaft 8, key 19, and sleeve 18 and, simultaneously, through key 29, sleeve 28 and through appropriate cavities 16 and 26 to respective overrunning clutch assemblies 17 and 27 as overrunning clutch assembly 17 simultaneously engages inner periphery of base element 12 having flange 11 mating with front of engine 4. Meanwhile overrunning clutch assembly 27 simultaneously, engages outer periphery os sleeve 28 and inner periphery of base element 22 having flange 21 mating with rear of engine 4 as both assemblies 17 and 27 utilize common central axis of crankshaft 8. An L shaped securing block 13 with transversing aperture 14 is positioned adjacent flange 11 of base element 12 which is mating front of engine 4. Bolt 15 is adapted in aperture 14 as is threadingly engages hole 5. Bolt 15 is tightened so to lock rectangular block 13 and base element 12 together and with the front of engine 4 to form control unit 10. Another L shaped securing block 23 with transversing aperture 24 is positioned adjacent flange 21 of base element 22 that is mating rear end of engine 4. Bolt 25 is adapted in aperture 24 and threadingly engages hole 7. Bolt 15 is tightened so to lock rectangular block 23 and base element 22 together and to the rear of engine 4 to form 2nd control unit 22. Thus, the installation enables the engine to give effect as the crankshaft rotations reflect positive translation. Wherein velocity increase potential and the value of positive translation is defined as PT, velocity gain is defined as $\Delta v$, and positive translated velocity is defined as PTV in the equations provided further herein.

Accordingly, the following computations disclose the derivations and definition of the variables used in the equations which illustrate the value of positive translation (PT), velocity gain ($\Delta V$), and positive translated velocity (PTV).

In two-stroke engine there is only one revolution per impulse which is constant in a two-stroke engine in

1.

$$V/RPI \times N \times PT/\pi D \times N \times PT/C = \Delta V \qquad (a)$$

(b) where
V = velocity (revolutions/minute)
RPI = (revolutions/impulse) = constant
N = number of combustion chambers
PT = positive translation (centimeter/impulse)
$\pi$ = 3.14 = pi
D = diameter of crankshaft
C = circumference of crankshaft (cm)
$\Delta V$ = velocity gain (revolutions/minute)

2.

$$V + \Delta V = PTV \qquad (a)$$

(b) where:
V = velocity (revolutions/minute)
$\Delta V$ = velocity gain (revolutions/minute)
PTV = positive translated velocity (revolutions/minutes)

It will be appreciated that many embodiments are possible without departing from the spirit and scope of the invention. Universal benefits would be attained through lower manufacturing costs, maintenance, and operation costs.

Having herein described the invention, what is claimed as new is:

1. Apparatus for providing application controlling transmission pulses of an engine for giving positive effect comprising: base member means having a circular internal cavity about a central axis positively constant engagement means engaging periphery of said internal cavity of said base member simultaneously engaging the external periphery of a sleeve means for defining a rotatable interconnection of said base member with said sleeve means, and positively constant engagement means rotatably surrounds said sleeve means being secured to and surrounding portion of a crankshaft extending out of front of said engine, securing means for said base member includes an aperture in portion of block means, said block means further includes portion adjacent said base member positioned adjacent said engine, threadingly engaging means adapted in said aperture and threadingly engaging said engine whereby positive constant effective means is defined by said thread engaging means removably securing and mating said block means and said base member means together and with the front of said engine wherein there is a second base member means having a circular internal cavity about said central axis, a second positively constant engagement means engaging the external periphery of a second sleeve means for defining rotatable interconnection of said second base member with said second sleeve means, said second positively constant engagement means rotatably surrounds the second sleeve means being secured to and surrounding a second of said crankshaft extending out of the rear of said engine for receiving, simultaneously, rotational drive from said engine, said second base member is secured to the rear of the engine in the same manner as said base member is secured to the front of the engine.

2. The combination of claim 1 wherein velocity increase potential of said crankshaft being rotated intermediate the base members reflect positive translation, wherein the value of positively translated velocity, is defined in the following equations 1.
$$V/RPT \times N \times PT/rrD = V/RPI \times N \times PT/C = V \quad (a)$$

(b) where
 V = velocity (revolutions/minute)
 RPT = (revolutions/impulse) = constant
 N = number of combustion chambers
 PT = positive translation (centimeter/impulse)
 rr = 3.14 = pi
 D = diameter of crankshaft
 C = circumference of crankshaft (cm)
 V = velocity gain (revolutions/minute)

2.
$$V + V = PTV \quad (a)$$

(b) where
 V = velocity (revolutions/minute)
 V = velocity gain (revolutions/minute)
 PTV = positive translated velocity (revolutions/minute).

* * * * *